Aug. 15, 1939.  J. A. ST. CLAIR  2,169,398

TOOL-SHAPING TEMPLATE

Filed March 30, 1938

INVENTOR.
John A. St. Clair

Patented Aug. 15, 1939

2,169,398

UNITED STATES PATENT OFFICE 2,169,398

TOOL-SHAPING TEMPLATE

John A. St. Clair, Indianapolis, Ind.

Application March 30, 1938, Serial No. 198,876

2 Claims. (Cl. 29—76)

This invention relates to box tool shaping template the same and one feature of the invention is in so shaping the abutting end of one cutting blade that a portion thereof will extend over the inner beveled portion of another blade and cause a perfect square corner on the blank being cut, when the blades are assembled together.

Another feature of the invention is the provision of a tool or gauge for determining the shape and extent of the projection or over extending portions of the abutting ends of the cutting blades.

A further feature of the invention is in so constructing the gauge that it, together with the cutting blade to be shaped, may be secured together in a suitable clamping device.

Other objects and advantages will be hereinafter more fully set forth.

In the accompanying drawing.

Figure 1:
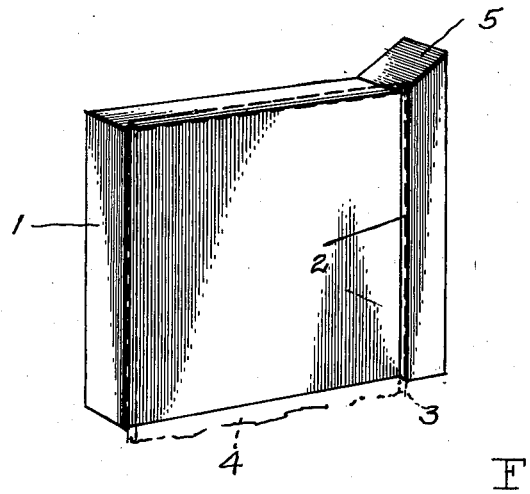
Figure 1 is a perspective view of the gauge or tool employed for shaping the ends of cutting blades, with a blade shown in cooperation therewith by dotted lines.
Figure 2:
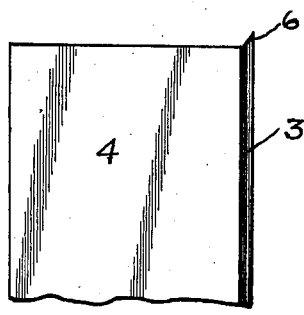
Figure 2 is an elevational view of one end of a cutting blade after being shaped.

Referring to the drawing, the numeral 1 designates the gauge or shaping tool comprising a more or less angular shaped body portion of extremely hardened metal.

Adjacent one edge of the body portion of the shaping tool 1 is a shoulder 2, formed by increasing the thickness of the gauge laterally, against which the bit edge 3 of the cutting tool 4 is rested when the end of the cutting tool is to be shaped, as shown by dotted lines in Fig. 1.

Figure 3:
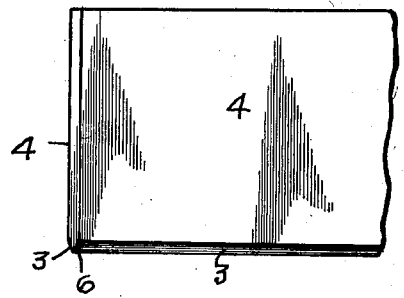
Figure 3 is a fragmentary elevation of two of the cutting blades assembled together ready for cutting purposes.
Figure 6:
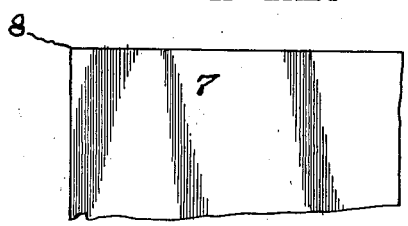

The upper end of the thickened portion of the gauge 1 is beveled upwardly from the top end of the shaping tool 1 as shown at 5 the extreme height of the tapered portion extending a distance above the top end portion of the shaping tool, the plane of the bevel corresponding to the plane of the taper of the cutting edge or bit 3, so that when the end of the tool 4, projecting above the upper end of the shaping tool is treated or filed down to correspond to the shape of the top edge and tapered face of the shaping tool, a projection 6 will be formed on the abutting end of the cutting tool which fits snugly the contour of the tapered bit 3 of the cooperating cutting tool 5 (see Fig. 3) so that when a blank 7 is cut, a smooth right angular incision 8 will be made as shown in Fig. 6.

Figure 4:
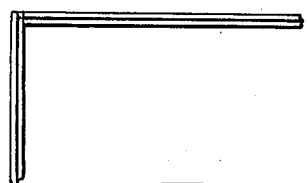
Figure 4 is an edge elevation of a pair of cutting blades of the design commonly used and before being shaped for making a square corner cut.
Figure 5:
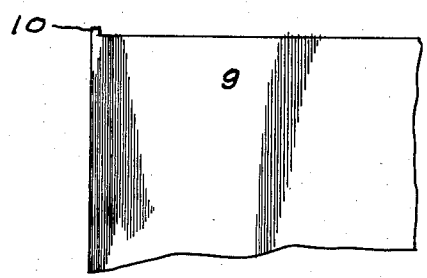
Figure 5 is a fragmentary elevation of a blank cut by the blades shown in Fig. 4, and, Figure 6 is a similar view of a blank cut by the present form of cutting blades.

It has been found that in using the cutting tools as now commonly constructed, (see Fig. 4) which do not have the projection 6 thereon, the severed blank 9 (see Fig. 5) is left with an unsevered portion 10 at the corner, which is not only unsightly but tends to interfere with the proper folding of the blank, especially when forming a box structure.

In applying the device to use, a cutting blade or tool 4, with the cutting edge or bit 3 formed thereon, is placed against one face of the shaping tool 1, with the top end thereof above the top edge of the shaping tool and substantially in line with the top end of the shoulder 2, the bit 3 being rested against the shoulder, in which position the two parts are clamped together by any suitable clamping means.

That portion of the blade or tool 4 above the shaping tool 1 and inclined or beveled portion 5 is then removed by filing or grinding or in any suitable manner and as the lateral distance between the lower end of the bevel portion 5 and the top end of the shoulder 2 is equal to the depth of the cutting edge or bit 3, the projection 6 will be formed at the end of the cutting edge of the tool 4, with a taper coincident to the taper of one face of the cooperating cutting edge 3, so that when the cutting tools 4 are assembled together to form a cutting die, the tapered faces of the projections on one of the tools 4 will project beneath and fit the tapered faces of the cutting edges 3 of the cooperating assembled cutting tools 4 and make a perfect incision at the corners of the blank being cut.

What I claim is:

1. A gauge for forming a projection at the end of the cutting edge of a tool comprising a substantially angular body, the top end of said body having an elongated flat surface terminating in an upwardly beveled surface adjacent one edge of said body, a vertically extending shoulder on one face of said body the top end of which intersects said beveled portion at a point between the ends of the beveled portion, whereby when a cutting tool is placed against one face of the gauge with the cutting edge thereof engaging said shoulder and the top end of the tool substantially in line with the upper end of said shoulder, a projection will be formed at the end of the cutting edge of the tool when that portion of the tool projecting above the top of the gauge and beveled portion is removed from the tool.

2. A gauge for forming a bevel faced projection at the end of the cutting edge of a tool comprising a body portion having a flat top end terminating in an upwardly beveled surface adjacent one edge of the body portion, a portion of said body portion adjacent one edge thereof being increased in thickness to form a vertically extending shoulder, the top end of which intersects said beveled surface between the ends of said bevel, whereby when a tool is placed against said gauge with the top end of the tool substantially in line with the upper end of said shoulder and that portion of the tool above said top end removed a projection will be formed at the end of the tool adjacent one edge thereof, and at an angle to the end surface of the tool.

JOHN A. ST. CLAIR.